(12) United States Patent
Jamieson et al.

(10) Patent No.: US 7,079,228 B2
(45) Date of Patent: Jul. 18, 2006

(54) COMBINED LASER ALTIMETER AND GROUND VELOCITY MEASUREMENT APPARATUS

(75) Inventors: James R. Jamieson, Savage, MN (US); Gary E. Halama, Burnsville, MN (US); Clinton T. Meneely, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 208 days.

(21) Appl. No.: 10/825,062

(22) Filed: Apr. 15, 2004

(65) Prior Publication Data

US 2005/0231710 A1    Oct. 20, 2005

(51) Int. Cl.
  *G01P 3/64*      (2006.01)
  *G01C 3/20*      (2006.01)

(52) U.S. Cl. .................. 356/28.5; 356/28; 356/4.06; 356/4.08

(58) Field of Classification Search .......... 356/4.01, 356/4.06, 5.01, 5.14, 28, 28.5, 453–454; 359/629–640, 260
See application file for complete search history.

(56) References Cited

U.S. PATENT DOCUMENTS

| 6,665,063 | B1 | 12/2003 | Jamieson et al. | |
| 6,717,655 | B1* | 4/2004 | Cheng et al. | 356/4.01 |
| 6,894,768 | B1* | 5/2005 | Caldwell et al. | 356/28 |
| 2003/0043058 | A1* | 3/2003 | Jamieson et al. | 340/961 |

* cited by examiner

*Primary Examiner*—Thomas H. Tarcza
*Assistant Examiner*—Isam Alsomiri
(74) *Attorney, Agent, or Firm*—Calfee, Halter & Griswold LLP; Peter M. Hernandez

(57) ABSTRACT

Combined laser-based apparatus for determining both altitude and ground velocity of an aircraft comprises: a laser source for emitting pulsed laser beams substantially at a predetermined wavelength; a plurality of first optical elements for directing the laser beams from a first optical path to a second optical path which exits the first optical elements; a plurality of second optical elements configured to form a telescope, the second optical path and telescope field of view being fixedly co-aligned; an optical scanner for directing the second optical path and telescope field of view to desired ground positions while maintaining the co-alignment thereof; the telescope for receiving Doppler wavelength shifted reflections of the pulsed laser beams and directing the received ground reflections substantially over a third optical path; an optical filter element for separating the ground reflections of the third optical path into first and second portions that are dependent on the Doppler wavelength shift of the ground reflections; and processing means for determining altitude and ground velocity of the aircraft based on the first and second portions.

25 Claims, 6 Drawing Sheets

COMBINED LASER ALTIMETER AND GROUND VELOCITY MEASUREMENT APPARATUS

BACKGROUND OF THE INVENTION

The present invention is directed to avionic systems for measuring above ground level (AGL) altitude and ground velocity of an aircraft in general, and more particularly, to combined laser measurement apparatus for measuring both above ground level (AGL) altitude and ground velocity of the aircraft.

Today's military and commercial aircraft desire more precise measurements of aircraft position and position information. Ground based RADAR systems and Global Positioning Systems (GPS) allow for precise positioning of an aircraft in latitude and longitude desirable for air traffic control, aircraft separation, and navigation. However, precise AGL measurements are often difficult to achieve with such systems, especially for applications in which precise placement above the ground is needed. New levels of precision for altitude or AGL measurements, on the order of +/−6 inches (15 cm), for example, are often required for flight profiles ranging from hover, to nap of the earth (NOE) flight, and autonomous landing. Current aircraft altimeter systems generally can not achieve these precise measurements.

Recently, laser-based altimeters have been proposed for use on-board aircraft. This laser altimeter technology presents a significant advancement over radar altimeters as the ground registered data contains a higher level of resolution due to the narrow beam of the laser. However, the laser altimeters do pose certain concerns when applied to aircraft, especially with regard to the volume of the instrument attributed to the large number of optical elements contained therein. Another concern is directed to the ruggedness of the instrument in an aircraft flight environment. The optical elements of the laser altimeter are generally mounted on an optical bench, adjusted to be precisely aligned with respect to each other and secured in place. But, because of the vibration, shock and wide temperature variation encountered in aircraft flight, the optical elements have a tendency to become misaligned over time and thus, require constant maintenance. In bi-static laser altimeter configurations, back scattering of laser beam transmissions into a telescope portion is an additional concern.

A laser altimeter which overcomes the aforementioned concerns of laser altimeters by providing a compact laser altimeter which improves upon size, ruggedness and maintenance of the instrument is described in the co-pending U.S. patent application Ser. No. 10/386,334, filed Mar. 11, 2003, entitled "Compact Laser Altimeter System" and assigned to the same assignee as the instant application.

Laser systems have also been proposed for use on-board the aircraft in measuring the ground velocity thereof. These ground velocity laser systems propose to use the backscattering of laser emissions off of the ground, similar to laser altimeters, to measure the ground velocity. However, such laser based ground velocity measurement systems usually have more stringent optical alignment concerns than those for the laser altimeters described above.

The present invention overcomes the aforementioned concerns by integrating the capability of measuring ground velocity into a laser altimeter system, such as the system described in the co-pending patent application Ser. No. 10/386,334, for example, to effect a laser based system for measuring both AGL altitude and ground velocity in a common instrument. Through use of common optical and signal processing elements, the resulting combined instrument maintains substantially the features of small size, ruggedness and maintenance of the laser altimeter of co-pending application Ser. No. 10/386,334.

SUMMARY OF THE INVENTION

In accordance with one aspect of the present invention, combined laser-based apparatus for determining both altitude and ground velocity of an aircraft comprises: a laser source for emitting pulsed laser beams substantially at a predetermined wavelength over a first optical path; a plurality of first optical elements for directing the laser beams from the first optical path to a second optical path which exits the first optical elements; a plurality of second optical elements configured to form a telescope with a predetermined field of view, the second optical path and telescope field of view being fixedly co-aligned; an optical scanner disposed in the second optical path for directing the second optical path and telescope field of view to desired ground positions while maintaining the co-alignment thereof; said telescope for receiving from the desired ground positions Doppler wavelength shifted reflections of the pulsed laser beams within the field of view thereof and directing the received ground reflections substantially over a third optical path; an optical filter element disposed in the third optical path for separating the ground reflections of the third optical path into first and second portions that are dependent on the Doppler wavelength shift of the ground reflections; and processing means for determining altitude and ground velocity of the aircraft based on the first and second portions.

In accordance with another aspect of the present invention, laser-based apparatus for generating signals for use in determining both altitude and ground velocity of an aircraft comprises: a laser source for emitting pulsed laser beams substantially at a predetermined wavelength over a first optical path; a plurality of first optical elements for directing the laser beams from the first optical path to a second optical path which exits the first optical elements; a plurality of second optical elements configured to form a telescope with a predetermined field of view, the second optical path and telescope field of view being fixedly co-aligned; the telescope for receiving Doppler wavelength shifted reflections of the pulsed laser beams within the field of view thereof and directing the received reflections substantially over a third optical path; an optical filter element disposed in the third optical path for separating the reflections of the third optical path into first and second portions that are dependent on the Doppler wavelength shift of the reflections; and light detection means for receiving the first and second portions and generating first and second signals representative of the first and second portions, respectively.

In accordance with a further aspect of the present invention, A distributed laser-based system for use on-board an aircraft for determining both altitude and ground velocity of the aircraft comprises: at least three laser-based measurement apparatus for disposition at different locations on the aircraft, each said apparatus comprising: a laser source for emitting pulsed laser beams substantially at a predetermined wavelength over a first optical path; a plurality of first optical elements for directing the laser beams from the first optical path to a second optical path which exits the first optical elements; a plurality of second optical elements configured to form a telescope with a predetermined field of view, the second optical path and telescope field of view being fixedly co-aligned; the telescope for receiving Doppler wavelength shifted reflections of the pulsed laser beams within the field of view thereof and directing the received reflections substantially over a third optical path; an optical filter element disposed in the third optical path for separating the reflections of the third optical path into first and second portions that are dependent on the Doppler wavelength shift of the reflections; and light detection means for receiving the first and second portions and generating first and second signals representative of the first and second portions, respectively; each laser laser-based apparatus configurable to direct its co-aligned second optical path and telescope field of view from the aircraft to a different ground position from the other laser-based apparatus; and a processing unit for receiving and processing the first and second signals from the at least three laser-based apparatus to determine both the altitude and ground velocity of the aircraft.

DETAILED DESCRIPTION OF THE INVENTION

The principle used in the present laser-based ground velocity measurement apparatus embodiment is to emit pulses at a predetermined wavelength and pulse repetition rate from a laser source to a position on the ground and receive the laser light backscattering off of the ground position. The backscattering of laser light will be Doppler shifted in wavelength in proportion to the portion of the ground speed of the aircraft along the directional vector of the scan position of the emitted laser pulses. Thus, by determining the Doppler shift of the emitted wavelength and the scan position of the laser beam, the associated ground speed projected along the directional vector may be calculated. By triangulating these projected ground speed measurements at three or more scan positions or angles, the absolute ground velocity of the aircraft may be determined, without requiring aircraft attitude information. The term "ground" as used in this application shall mean any surface over which the aircraft may fly including land, water, objects, . . . etc. and any combinations thereof.

Figure 1:
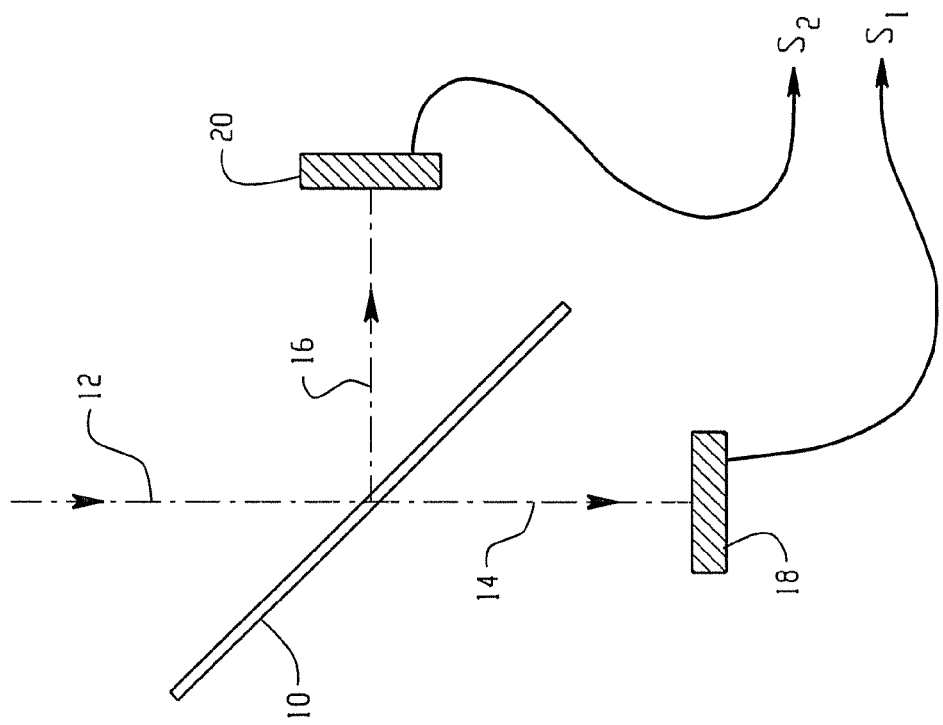
FIG. 1 is an illustration of apparatus for filter edge detection of Doppler shifted wavelength ground return signals suitable for use in an embodiment of the present invention.

In the present embodiment, Doppler shift of wavelength is determined by a process of filter edge detection. FIG. 1 is an illustration of apparatus for filter edge detection of Doppler shifted wavelength ground return signals suitable for use in the present embodiment which will be described herein below in connection with the illustration of FIG. 3. Referring to FIG. 1, an optical filter element 10 which may be a dichroic beam splitter, for example, is disposed in an optical path 12 of the Doppler shifted ground return pulses.

Figure 2:
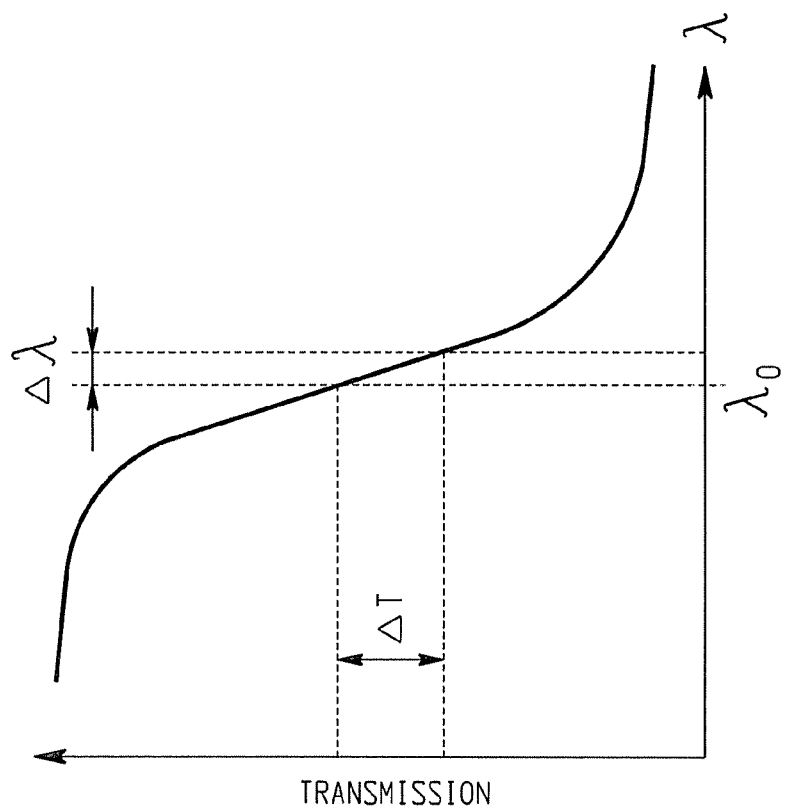
FIG. 2 is a graph of a response characteristic curve of an optical filter element suitable for use in the apparatus of FIG. 1.

The optical filter element 10 has a response characteristic curve shown by way of example in the graph of FIG. 2. Note that the response curve exhibits a very sharp cut off transmission response with respective to wavelength. In the present embodiment, the filter angle of the optical element 10 is tuned such that the unshifted laser line $\lambda_0$ is approximately half-way down the cut-off edge. In this manner, a Doppler shift in wavelength of $\Delta\lambda$ will fall along the filter edge of the response curve and effect a difference $\Delta T$ in filter transmission of the ground return pulses. Thus, as shown in the illustration of FIG. 1, a first portion of the ground return pulses will be transmitted or passed through the optical filter element 10 along an optical path 14 based on the wavelength Doppler shift $\Delta\lambda$ thereof. A second or remaining portion of the ground return pulses will be reflected by the optical element 10 along an optical path 16. There may be some loss of optical signal in the filter element 10, but this should affect both the transmitted and reflected portions in a measurable and repeatable manner and thus can be accounted for in the data processing.

While a dichroic beam splitter is used as the optical filter element 10 in the present embodiment, it is understood that other optical filter elements may be used just as well. Examples of other optical filter elements which may be used include: optical etalons or Fabry-Perot cavities tuned by tilting; pressure, thermal control, or piezo-electric drivers; bandpass filters with sufficiently sharp edges; and atomic or molecular gas absorption filters. If this system is embodied in a fiber-optic configuration, a tunable fiber optic etalon may also be used, for example.

Light detectors 18 and 20 may be disposed in the paths 14 and 16 of the transmitted and reflected portions of the ground return pulses, respectively, to receive and convert the respective light pulses into electrical signals proportional thereto. Accordingly, electrical signals $S_1$ and $S_2$ output from the signal detectors 18 and 20 are proportional to the transmitted and reflected portions, respectively, of the ground return pulses. By taking the ratio of the sum and difference of the electrical signals $[(S_2-S_1)/(S_1+S_2)]$ while accounting for losses in the filter element, ground return pulse amplitude effects may be substantially eliminated in determining the wavelength Doppler shift $\Delta\lambda$ of the ground return pulses. Due to differing filter edge shapes, this ratio expression may not bear a linear relationship to the Doppler shift, but the exact relationship can be determined for the particular filter used.

Figure 3:
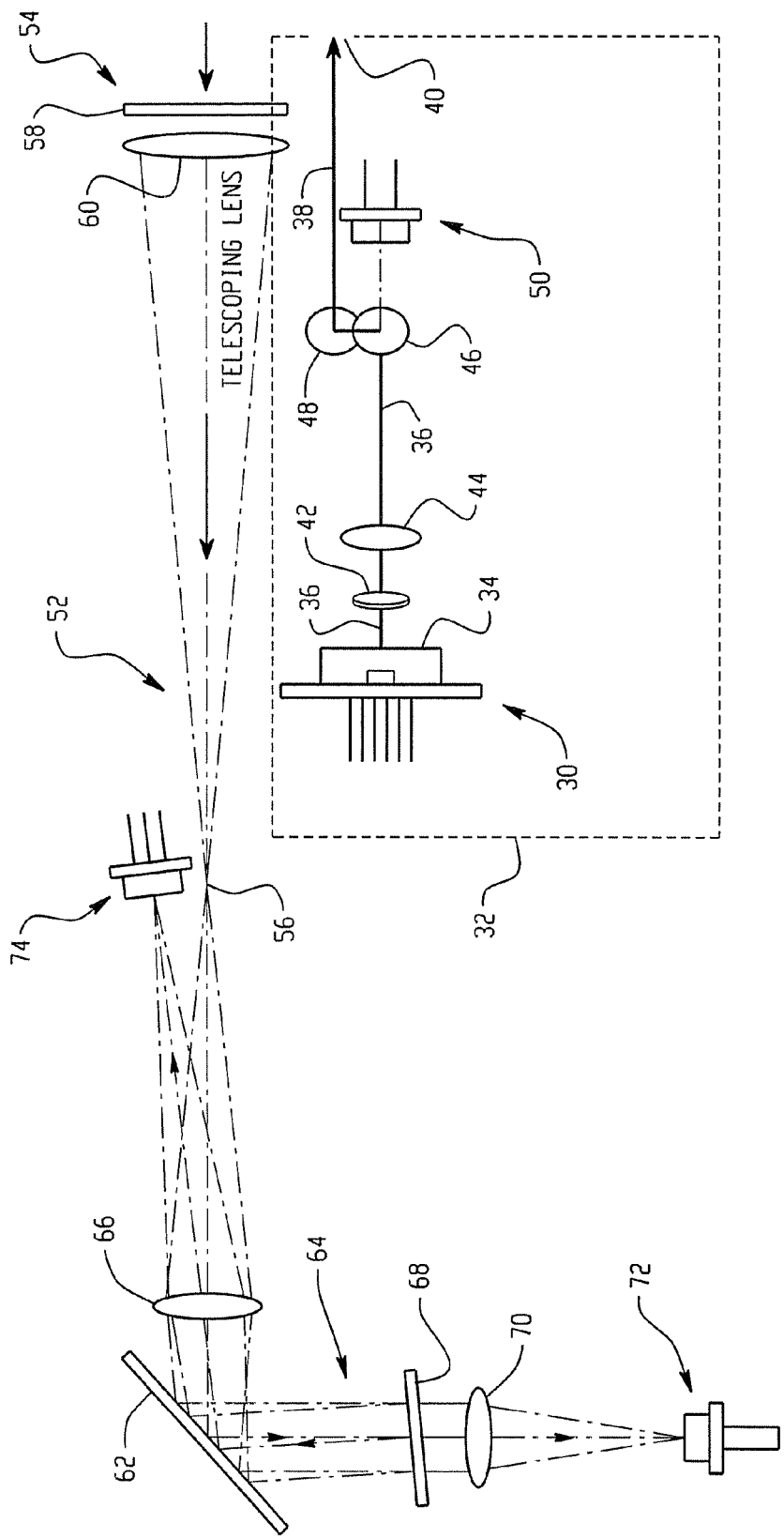
FIG. 3 is an illustration of a combined laser altimeter and ground speed measurement apparatus suitable for embodying the broad principles of the present invention.

A combined laser altimeter and ground speed velocity instrument suitable for embodying the principles of the present embodiment is shown in the illustration of FIG. 3. The embodiment of FIG. 3 uses many of the same optical elements and is configured in much the same way as an embodiment described in the above-referenced co-pending patent application Ser. No. 10/386,334 which is incorporated by reference herein for providing a more detailed description thereof and other suitable exemplary embodiments of a laser altimeter instrument for use in the present invention. Referring to FIG. 3, a laser source 30 is disposed in a laser transmitter assembly denoted by the dashed line block 32.

The laser source 30 may be a microlaser of the type manufactured by Northrup Grumman Poly-Scientific, bearing model number ML0005, for example. In the present embodiment, the microlaser 30 is a passively Q switched autonomously operated microchip laser pumped by a 950 micron diode to generate pulsed laser beams at a rate of approximately 8–10K pulses per second (pps) and at a predetermined wavelength, which may be approximately 1064 nanometers (nm), for example.

The microlaser 30 may be contained in a TO-3 container or can which may be fixedly secured to a wall of a housing the instrument much in the same manner as described for the embodiment of the incorporated co-pending application. The TO-3 can also includes a windowed top surface 34 from which to emit the pulsed laser beams over a first optical path 36. It is understood that the specific pulse repetition rate and wavelength of the microlaser 30 are provided merely by way of example, and that other rates and wavelengths may be used just as well without deviating from the broad principles of the present invention. For example, for eye safe operation, a laser emitting at a wavelength of approximately 1.5 microns may be chosen.

Fixedly supported in a compact configuration within an emission cavity of the instrument is a plurality of first optical elements for directing the laser beams from the first optical path 36 to a second optical path 38 which exits the housing of the instrument through an exit aperture at 40. The plurality of first optical elements may comprise a band pass or blocking filter optical element 42 disposed in proximity to the windowed surface 34 of the microlaser 30 along the optical path 36. The optical element 42 may cover substantially the entire emission cavity opening so as to block substantially the laser pump diode light and other wavelengths of light outside of a predetermined bandwidth around the predetermined wavelength of the laser beam from entering the emission cavity. To minimize optical feedback that may cause laser instabilities and to minimize the heat load on the laser chip, optical element 42 may be disposed at an angle to the optical path 36 so that the surface thereof does not reflect light directly back into the laser source 30.

Another first optical element of the plurality may be a collimating lens 44 disposed along the first optical path 36 down stream of the filter element 42 for collimating and preventing further divergence of the laser beams along the path 36. Collimating lens 44 may be disposed along path 36 so as to match the laser beam divergence to a field of view of a telescope portion of the altimeter for optimum efficiency as will become better understood from the description below. While the lens 44 and filter 42 are provided in the present embodiment, it is understood that due to the laser selected and the compactness of the overall configuration, one or both of the lens 44 and filter 42 may not be used in some applications.

To render the compact configuration of first optical elements, it is understood that the emission beam path or optical train of the transmitter assembly may take various shapes. In the present embodiment, the beam path is shaped into a vertical "Z" with the elements 42 and 44 on a top level and the exit aperture 40 disposed at a bottom level. A vertical channel of the assembly cavity connects the top and bottom levels. Two fold mirrors 46 and 48 are included in the plurality of first optical elements and disposed at the vertical channel to direct the first optical path 36 from the top level to the bottom level and to move the beam close to the receiving telescope portion to minimize the range at which the telescope field of view and the laser spot start to overlap.

The fold mirror 46 is disposed at the top level and the other fold mirror 48 is disposed at the bottom level. Accordingly, the combination of fold mirrors 46 and 48 direct the first optical path 36 to the second optical path 38 which exits the housing 10 at aperture 40. One of the fold mirrors 46 or 48 comprises mirror apparatus which is fixedly adjustable for directing the second optical path 38 along a desired optical path as will become more evident from the following description. Preferably, the top fold mirror 46 is the adjustable mirror, but it is understood that that either fold mirror 46 or 48 may be used for adjustment purposes or both mirrors may be adjustable along the independent axes.

Thus, all of the first optical elements are fixedly supported and not movable in the emission cavity of the instrument, except for the adjustable mirror of either fold mirror 46 or 48, and even such mirror apparatus is lockable in place once properly adjusted. The top level of the emission cavity may extend slightly beyond the vertical channel for locating a light detector 50, which may be a photo-diode, for example. In this embodiment, the fold mirror 46 is configured to pass a small portion of the pulsed laser beams for detection by the light detector 50 which converts the detected laser pulses into electrical signals for use as start pulses for time-of flight calculations as will become more evident for the description found herein below.

The instrument housing may further include another cavity for containing processing electronics for the laser altimeter and ground speed velocity measurements much in the same manner as described in the incorporated co-pending application. Such processing electronics may be implemented on one or more printed circuit (PC) boards, for example. The light detector 50 may be coupled to the electronics in the electronics cavity for providing the start pulses for time-of-flight and ranging calculations thereby. Alternatively, a light detector diode may be embodied in the TO-3 can of the microlaser 30 for detecting and providing laser start pulses to the processing electronics via an electrical coupling thereto. If a triggerable pulsed laser is used, the trigger signal may also serve as the timing start pulse. It is understood that these techniques for generating trigger or start pulses are provided by way of example and that any method used will depend on available space and the particular optical system design.

A telescope portion 52 comprising a plurality of second optical elements is included in another hollow cavity of the instrument with an entrance aperture at 54 much in the same manner as described in the incorporated co-pending application. The plurality of second optical elements are fixedly disposed and configured within the hollow cavity to form a telescope with a predetermined field of view which is preferably fixed. The telescope portion 52 is operative to receive at the entrance aperture 54 reflections of the pulsed laser beams from the ground position within the field of view thereof and to focus the received reflections substantially to a focal point 56. The telescope portion 52 includes a band pass filter optical element 58 disposed at the entrance aperture 54 for passing received wavelengths of light solely within a predetermined bandwidth around the predetermined wavelength $\lambda_0$ of the pulsed laser beams. Thus, the filter optical element 58 minimizes background light interference from the outside environment from entering the telescope cavity. In addition, the field of view of the telescope may have to be minimized to further reduce interference from background solar radiation, for example. In some applications, a clear window may be disposed at aperture 54 to seal and protect the telescope from scratches and outside contamination; however, the filter optical element 58 could be mounted in such a way to serve the same purpose.

To form the telescope, the telescope portion 52 includes a convex or converging lens 60 disposed in proximity to the entrance aperture 54. In the present embodiment, the telescope lens 60 is configured to have a predetermined focal length, which may be approximately 150 millimeters (mm), for example, for focusing the received reflections from the entrance aperture 54 to the focal point 56, which falls within the telescope cavity. A fold mirror 62 may be fixedly disposed within the telescope cavity downstream of the focal point 56 to reflect the received light rays illustrated by the arrowed lines along a different optical path 64. If the optical elements of the telescope portion 52 were to be used solely for AGL altitude measurements, then a single light detector would be disposed in the path 64 for receiving the light reflections off of the ground. The present embodiment combines the AGL altitude measurements with ground velocity measurements, and thus includes additional optical elements for this purpose.

One of the additional optical elements of the telescope portion 52 is a recollimating lens 66 disposed between the focal point 56 and fold mirror 62 to recollimate the expanding light reflections from focal point 56 prior to being reflected by the mirror 62. Accordingly, the light reflected by the mirror 62 along path 64 is substantially collimated. Another of the additional optical elements is a tilt-tuned etalon 68 disposed in the optical path 64. The etalon element 68 operates as the optical filter element 10 described in connection with the embodiment of FIGS. 1 and 2 and may be tilt-tuned so that the wavelength $\lambda_o$ falls mid-way along the sharp cut-off filter edge of the response curve as described supra. Thus, a portion of the ground reflected light will be transmitted through the etalon element 68 and be refocused by a lens 70 to a light detector 72 much the same as described for the embodiment of FIGS. 1 and 2.

Likewise, the remaining portion of the ground reflected light (absent that lost in the filter element itself) will be reflected by the etalon element 68 back to the fold mirror 62 along path 64. From mirror 62, the remaining portion of the ground reflected light is redirected by the mirror 62 back to the lens 70 wherein it is refocused to another light detector 74 much the same as described for the embodiment of FIGS. 1 and 2. Both of the light detectors 72 and 74 may be avalanche photo-diodes operative to convert the received light pulse into an electrical signal representative thereof. The outputs of the light detectors 72 and 74 may be coupled to the processing electronics in the electronics cavity for use in both ground velocity and altitude ranging calculations thereby as will become better understood from the description infra.

Moreover, while the emission, electronics and telescope cavities are provided in a common housing in the present embodiment, it is understood that such cavities may be provided in separate housings in an alternate embodiment. Such housings may be sections of a common housing in yet another embodiment. In any event, the common denominator for all such embodiments of the combined laser-based instrument is to render the unit compact and rugged for use in an aircraft flight environment. The present embodiment of the instrument may have overall exemplary dimensions in length L, width W and depth D of approximately 7.5 inches or 19 cm, 3.5 inches or 8.75 cm, and 3.5 inches or 8.75 cm, respectively. In addition, while the aforementioned additional elements are employed with the laser-based AGL altitude measurement embodiment of FIG. 3, it is understood they may also be implemented in other laser-based AGL altitude measurement embodiments, like those described in the incorporated co-pending application referenced herein above, for example, without deviating from the broad principles of the present invention.

Figure 4:
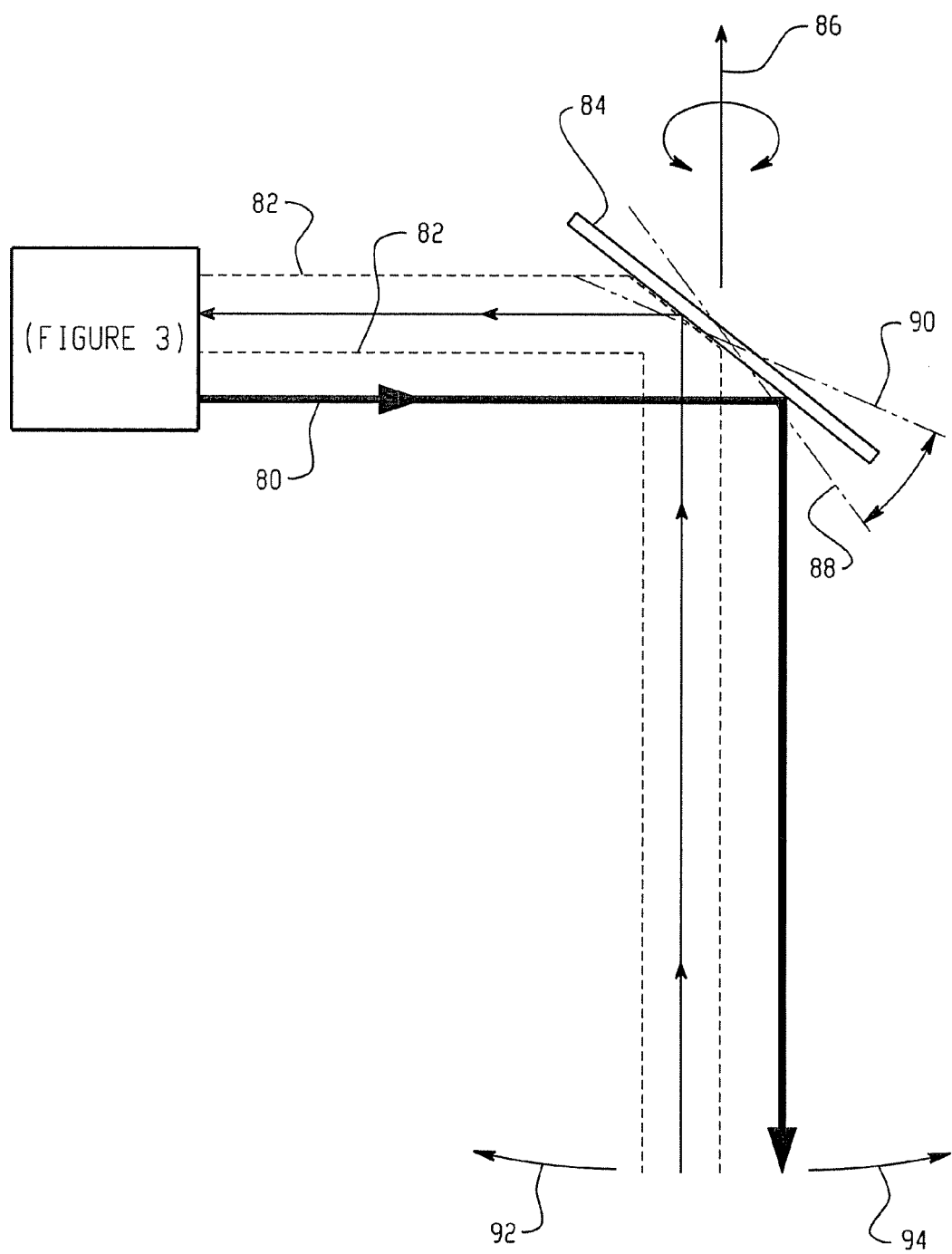
FIG. 4 is an illustration of apparatus for scanning both an emitted laser beam and a field of view of a telescope in fixed alignment suitable for use with the embodiment of FIG. 4.

The emission and telescope cavities, whether in the same housing or separate housings, are fixedly secured in alignment with respect to each other to permit the output optical path of the pulsed laser beams (see darkened arrowed line 80 in FIG. 4) to be fixedly co-aligned with the field of view of the telescope (see dashed lines 82 in FIG. 4). Note that only one first optical element of the plurality, like mirror 46, for example, is fixedly adjustable for co-aligning the output optical path 80 with the field of view 82. In the present embodiment, the emission and telescope cavities may be machined in the common housing to align the entrance and exit apertures respectively thereof in proximity to each other. It is preferable to have the apertures 40 and 54 as close as possible to each other. The exit aperture 40 may be offset slightly behind or in back of the entrance aperture 54 to avoid any direct backscattering of the transmitted laser beams into the entrance aperture 54 and telescope cavity. In addition, a flat window may be disposed at the exit aperture 40 for sealing the emission cavity from the outside environment. Also, this window may be tilted with respect to the plane of the exit aperture 40 to avoid reflections from the laser beams from traveling back down the transmitting optical path into the laser, possibly causing laser instabilities thereby. In addition, laser light may be reflected from the tilted window to a photodiode as another technique for generating the timing start pulses as described herein above.

FIG. 4 is an illustration of a scanner assembly suitable for use in the present embodiment for scanning the laser beam 80 and co-aligned field of view 82 of the telescope to different ground positions while maintaining the co-alignment. Referring to FIG. 4, a scanner mirror 84 is disposed in the path of the emitted laser beam 80 and co-aligned field of view 82 at an appropriate quiescent angle for projecting the laser beam 80 and co-aligned field of view 82 to a desired position on the ground. In the present embodiment, the scanner mirror 84 may be rotated about an axis 86 to different angles shown by the dashed lines 88 and 90 by a motor assembly (not shown). At the different angles 88 and 90, the scanner mirror moves the emitted laser beam 80 and co-aligned field of view 82 in directions as shown by the arrowed lines 92 and 94, respectively, to desired different ground positions. The mirror motor may be controlled to direct the laser beam 80 and co-aligned field of view 82 to a plurality of desired ground positions by the processing electronics as will become more evident from the following description.

Figure 5:
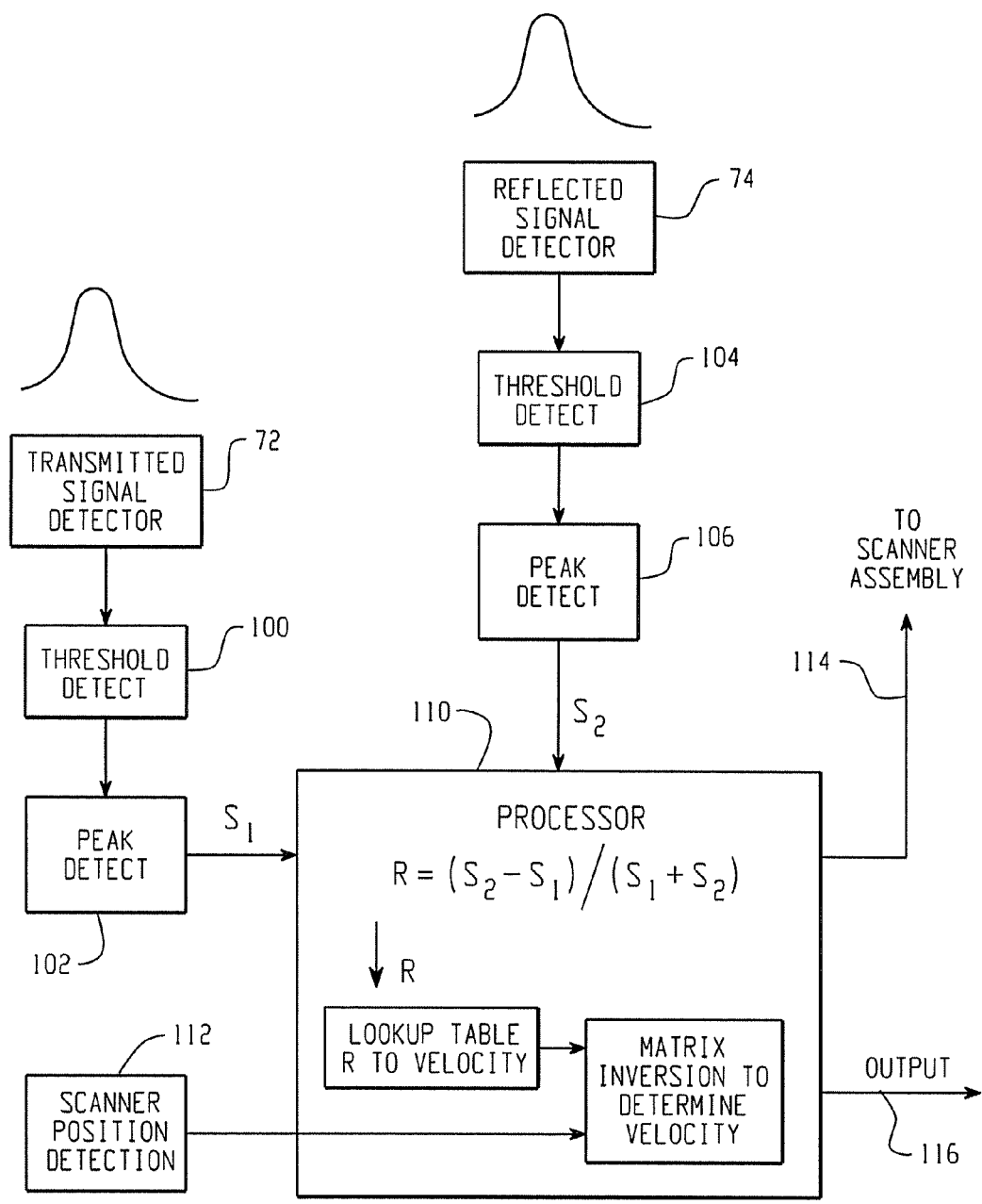
FIG. 5 is a functional block diagram schematic of processing electronics for computing a measurement of ground velocity suitable for use in the present embodiment.

A functional block diagram schematic of processing electronics for computing a measurement of ground velocity suitable for use in the present embodiment is shown in FIG. 5. The processing electronics may be disposed on one or more printed circuit (PC) cards located in the electronics cavity of the instrument, for example. Referring to FIG. 5, the light detectors 72 and 74 are represented by like reference numeral functional blocks. The output of light detector 72 which is an electrical pulse representative of the transmitted portion of the ground reflected pulse is input to a threshold detect block 100. If the electrical pulse amplitude of the transmitted signal portion is greater than a predetermined threshold, the block 100 passes the pulse signal to a peak detector block 102 which captures and outputs the peak amplitude, denoted as $S_1$, of the transmitted pulse signal.

Similarly, the output of light detector 74 which is an electrical pulse representative of the reflected portion of the ground reflected pulse is input to a threshold detect block 104. If the electrical pulse amplitude of the reflected signal portion is greater than a predetermined threshold, the block 104 passes the pulse signal to a peak detector block 106 which captures and outputs the peak amplitude, denoted as $S_2$, of the transmitted pulse signal. The signals $S_1$ and $S_2$ may be input to a processor 110, which may be a programmed microprocessor, for example. Also, the processing electronics may include a detector 112 for detecting the position of the laser beam scan (vector) at which each ground speed calculation is performed. The laser scan position may be provided as a motor drive signal or provided by a sensor located on the shaft of the scanner mirror, for example. In the processor 110, a ratio R is computed by taking the difference and sum of signals $S_1$ and $S_2$, and dividing the difference by the sum as follows:

$$R=[(S_2-S_1)/(S_1+S_2)] \text{ (note that } S_1 \text{ and } S_2 \text{ may have to be corrected for filter losses).}$$

A look-up table may be provided in the processor 110 for correlating ground speed with the above calculated ratio R. So, as a new ground reflection pulse is received, $S_1$ and $S_2$ are determined and the laser scan position is captured for that pulse. The ratio R is calculated and the portion of the ground speed along the directional scan vector of line-of-sight is accessed from the look-up table based on the instant ratio R. This portion of the ground speed and the associated scan position may be saved in processor 110. Thereafter, the scanner mirror 84 (see FIG. 4) may be directed by processor 110 over signal line 114, for example, to project the laser beam 80 and co-aligned field of view 82 to a different ground position and calculate the ground speed for this new ground position in the same manner. The process will be repeated by processor 110 until ground speeds are determined and saved for at least three ground scan positions. Then, the processor 110 may perform a triangulation calculation, perhaps by matrix inversion calculation, for example, on the three or more ground speeds and associated scan positions to determine the instantaneous velocity vector of the aircraft with respect to the ground, i.e. ground velocity. This calculation may be expressed in an orthogonal X, Y, and Z coordinate system by the following relationship:

| X, Y, Z Rotation Matrix | * | Ground Speed Vector | = | LOS Speed Vector |
|---|---|---|---|---|

Accordingly, an inversion of the X, Y, and Z Rotation matrix term multiplied by a matrix comprised of three different velocity vector terms produces the ground speed vector matrix with respect to the attitude of the aircraft and measuring instrument.

The amplitude of the ground speed vector, which is the vehicle ground speed, may be output over signal line 116. Note that the vehicle airspeed and attitude information is not required for this calculation of ground speed. However, if these data are accessible to the processor 110, absolute vehicle speed, direction and sideslip may also be calculated by the processor 110.

Figure 6:
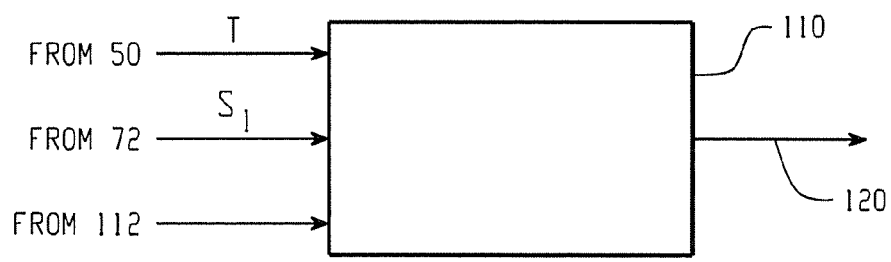
FIG. 6 is a block diagram of a processor for computing altitude suitable for use in the present embodiment.

The same processor 110 may be also programmed to perform an AGL altitude calculation using the start or trigger signal from the light detector 50 and signal $S_1$ from detector 72, for example, as shown in the block diagram of FIG. 6. A time-of-flight measurement may be performed from the time between the start and reception pulses from detectors 50 and 72, respectively, to determine the range to the instantaneous ground position. The processor may compensate the range for instantaneous laser scan position using the signal from the detector 112 to determine the actual AGL altitude which may be output over signal line 120. While the signal $S_1$ is used in the present embodiment for time of flight determinations, it is understood that $S_2$ or a combination of $S_1$ and $S_2$ may be used just as well. Accordingly, both AGL altitude and ground velocity may be determined from common electrical signals and processing electronics embodied in the combined laser-based apparatus.

Figure 7:
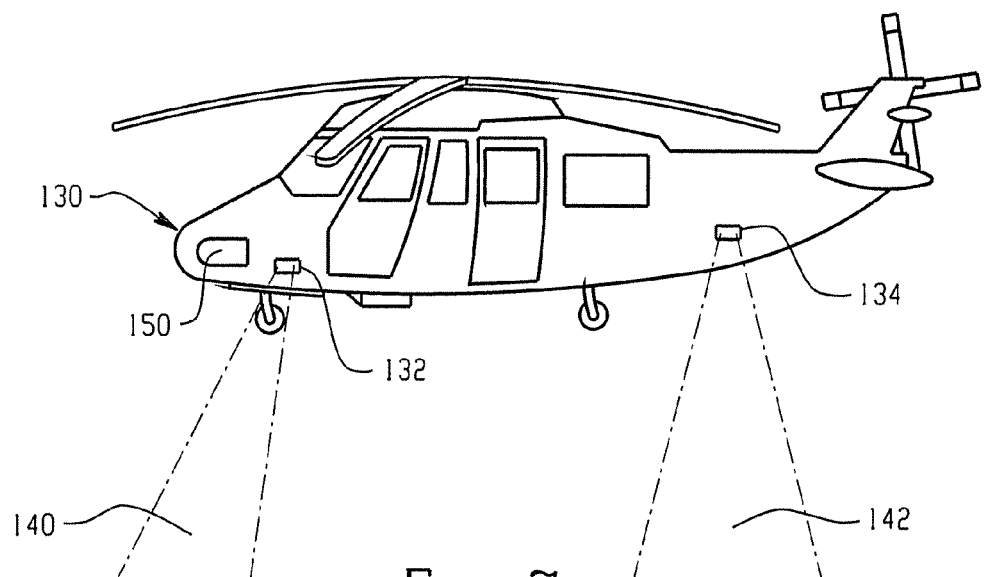
FIGS. 7 and 8 are side and top view illustrations of an exemplary alternate non-scanning embodiment of the present invention.
Figure 8:
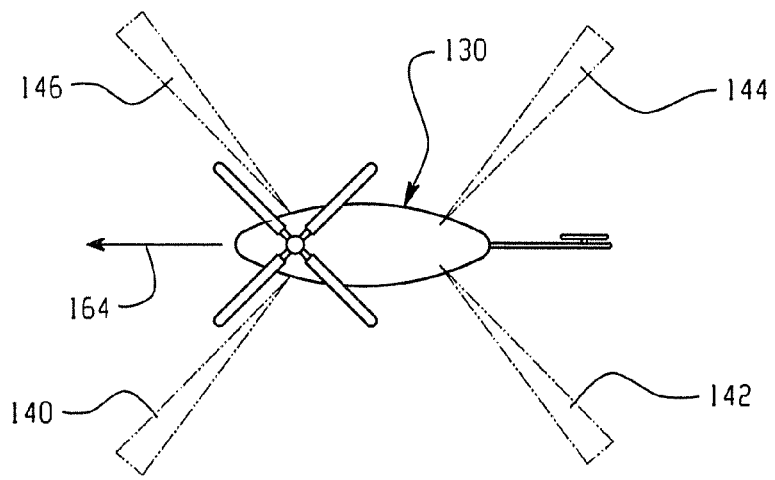

In an alternate non-scanning embodiment to the scanning embodiment described above in connection with FIG. 4, at least three of the combined laser-based measurement apparatus, such as that described for the embodiment of FIG. 3, for example, may be distributed at different locations about the aircraft. Such a non-scanning embodiment is shown in the illustrations of FIGS. 7 and 8 in which a helicopter 130 is used by way of example as the aircraft. While a helicopter aircraft is used for the alternate embodiment, it is understood that the multiple combined laser-based measurement apparatus may just as well be mounted on other aircraft, such as fixed wing aircraft, UAVs and PGMs, for example.

Referring to FIGS. 7 and 8, four combined laser-based measurement apparatus are mounted at different locations on the aircraft 130. In the side view of FIG. 7, only two such apparatus 132 and 134 are shown mounted to the side of the aircraft by way of example. The other two such apparatus may be mounted in similar locations on the other side of the aircraft 130 such as shown in the plan view of FIG. 8. The combined laser-based measurement apparatus may be adjusted to project each of their co-aligned emitted laser beam and field of view paths (see FIG. 4) 140, 142, 144 and 146 at predetermined vectors to corresponding ground positions. While four measurement apparatus are shown by the exemplary embodiment of FIGS. 7 and 8, it is understood that three or more than four measurement apparatus may be mounted to the aircraft for the non-scanning embodiment without deviating from the broad principles of the present invention.

Each of the at least three measurement apparatus may include a threshold detector and peak detector (see FIG. 5) for generating the corresponding transmitted and reflected signals $S_1$ and $S_2$, and a trigger light detector (e.g. 50, FIG. 3) for generating the start or trigger signal T. Accordingly, the signals T, $S_1$ and $S_2$ may be appropriately amplified, if desired, and output from each of the measurement apparatus to a remotely located central processing unit disposed on-board the aircraft. The block diagram schematic of FIG. 9 exemplifies a non-scanning distributed system for the aircraft in which three laser-based measurement apparatus 132, 134 and 136 are mounted to different locations thereof, such as shown by way of example in FIGS. 7 and 8, and output their respective signals T, $S_1$ and $S_2$ to a remotely located on-board processing unit shown within the dashed lines 150.

Figure 9:
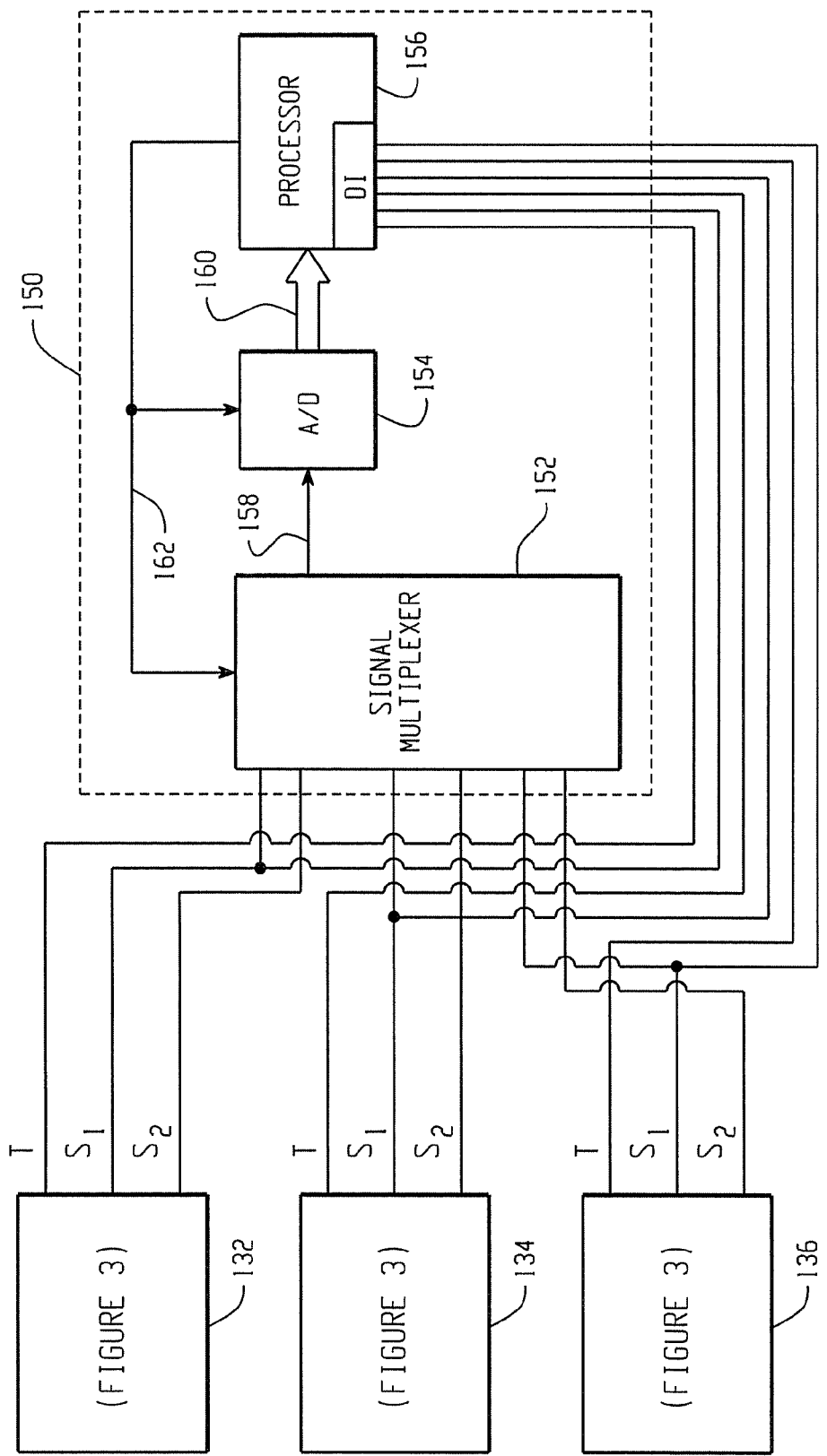
FIG. 9 is a block diagram schematic of exemplary processing electronics suitable for use in the alternate non-scanning embodiment.

Referring to FIG. 9, the processing unit 150 of the present embodiment may comprise a signal multiplexer 152, and analog-to-digital converter (A/D) 154 and a programmed processor unit 156. The signals T and $S_1$ from each of the apparatus 132, 134 and 136 may be coupled over signal lines to a digital input section (DI) of the processor unit 156. Such digital inputs may either be polled or configured as program interrupts by the processor 156 to identify a start and reception times for each of the measurement apparatus 132, 134 and 136. In addition, signals $S_1$ and $S_2$ from each of the apparatus 132, 134 and 136 may be coupled over signal lines to inputs of the multiplexer 152. An output 158 from the multiplexer 152 is coupled to an input of the A/D 154 and output data lines 160 of the A/D 154 are coupled to a data bus of the processor 156. The processor 156 may control the operations of the multiplexer 152 and A/D 154 over control lines 162. In this embodiment, the peak detectors (see FIG. 5) of each of the apparatus 132, 143 and 136 may include a sample-and-hold circuit to hold the peak signals $S_1$ and $S_2$ of a current interpulse period until the peak signals of the next interpulse period are determined.

In a typical operation, the apparatus 132, 134 and 136 may be autonomously operative to emit laser pulses periodically, receive the ground reflections during the interpulse periods and generate the signals T, $S_1$ and $S_2$ for each laser pulse period. The processor unit 156 is programmed to detect the start of each pulse period by monitoring the T signals and to compute the time-of-flight by monitoring the signals $S_1$ and/or $S_2$, for example, for each apparatus. Then, knowing the predetermined vector of the laser beam path, the processor 156 may calculate the AGL altitudes of the aircraft for the corresponding ground positions of the apparatus 132, 134 and 136.

In addition, the processor 156 may be programmed to read in the signals $S_1$ and $S_2$ from the apparatus 132, 134 and 136 for an interpulse period via control of the multiplexer 152 and A/D 154 and compute a ratio R (see FIG. 5) for each apparatus 132, 134 and 136 from the corresponding signals $S_1$ and $S_2$. Through use of a look-up table, the processor 156 may determine a speed of the aircraft for each computed ratio R corresponding to the apparatus 132, 134 and 136. The vector path of each apparatus 132, 134 and 136 may be pre-programmed into the processor 156 for use in combining with the corresponding calculated aircraft speed to compute the ground velocity 164 of the aircraft (see FIG. 8), preferably through a matrix inversion or a triangulation calculation. In this manner, the distributed system of apparatus 132, 134 and 136 may determine both AGL altitude and ground velocity of the aircraft using a common on-board processing unit 150.

While the present invention has been described above in connection with one or more embodiments, it is understood that these embodiments were presented by way of example. Accordingly, the present invention should not be limited in any way by the exemplary embodiments, but rather construed in breadth and broad scope in accordance with the recitation of the appended claims.

The invention claimed is:

1. Combined laser-based apparatus for determining both altitude and ground velocity of an aircraft, said apparatus comprising:
    a laser source for emitting pulsed laser beams substantially at a predetermined wavelength over a first optical path;
    a plurality of first optical elements for directing said laser beams from said first optical path to a second optical path which exits said first optical elements;
    a plurality of second optical elements configured to form a telescope with a predetermined field of view, said second optical path and telescope field of view being fixedly co-aligned;
    an optical scanner disposed in said second optical path for directing said second optical path and telescope field of view to desired ground positions while maintaining the co-alignment thereof;
    said telescope for receiving from said desired ground positions Doppler wavelength shifted reflections of said pulsed laser beams within the field of view thereof and directing said received ground reflections substantially over a third optical path;
    an optical filter element disposed in said third optical path for separating the ground reflections of said third optical path into first and second portions that are dependent on the Doppler wavelength shift of said ground reflections; and
    processing means for determining altitude and ground velocity of said aircraft based on said first and second portions.

2. The apparatus of claim 1 wherein the processing means includes:
    a first light detector for receiving and converting said first portion of ground reflections into first electrical signals representative thereof;
    a second light detector for receiving and converting said second portion of ground reflections into second electrical signals representative thereof; and
    a processor for determining the ground speed of the aircraft at each ground position based on a function of the first and second electrical signals.

3. The apparatus of claim 2 wherein the processing means includes a means for determining a laser beam ground scan vector of the scanner for each ground position; and wherein the processor is operative to associate the ground speed with the corresponding ground scan vector for each ground position.

4. The apparatus of claim 3 wherein the processor is operative to determine ground velocity using the ground speeds and corresponding ground scan vectors of at least three ground positions.

5. The apparatus of claim 4 wherein the processor is operative to determine ground velocity by a triangulation of the ground speeds and corresponding ground scan vectors of the at least three ground positions.

6. The apparatus of claim 2 wherein the processor is operative to determine the ground speed of the aircraft at a ground position based of a ratio of a difference over a sum of the first and second electrical signals corresponding to the ground position.

7. The apparatus of claim 1 wherein the optical filter element is operative to transmit the first portion of the ground reflections of said third optical path therethrough and to reflect the second portion of the ground reflections of said third optical path to a fourth optical path, said transmission and reflection of the first and second portions by the optical filter element being dependent on the Doppler wavelength shift of said ground reflections.

8. The apparatus of claim 7 wherein the optical filter element has a sharp cut off transmission response with respect to wavelength such that a small Doppler shift in wavelength away from the laser emission wavelength will produce a detectable change in transmission characteristics of the optical filter element.

9. The apparatus of claim 8 wherein the optical filter element is tuned to receive the laser emission wavelength along a cut off edge of the transmission response.

10. The apparatus of claim 9 wherein the optical filter element is tuned to receive the laser emission wavelength at approximately midway of the cut off edge of the transmission response.

11. The apparatus of claim 7 comprises a dichroic beam splitter.

12. Laser-based apparatus for generating signals for use in determining both altitude and ground velocity of an aircraft, said apparatus comprising:

a laser source for emitting pulsed laser beams substantially at a predetermined wavelength over a first optical path;

a plurality of first optical elements for directing said laser beams from said first optical path to a second optical path which exits said first optical elements;

a plurality of second optical elements configured to form a telescope with a predetermined field of view, said second optical path and telescope field of view being fixedly co-aligned;

said telescope for receiving Doppler wavelength shifted reflections of said pulsed laser beams within the field of view thereof and directing said received reflections substantially over a third optical path;

an optical filter element disposed in said third optical path for separating the reflections of said third optical path into first and second portions that are dependent on the Doppler wavelength shift of said reflections; and light detection means for receiving said first and second portions and generating first and second signals representative of said first and second portions, respectively.

13. The laser-based apparatus of claim 12 wherein the laser source is autonomously operative to periodically generate laser pulses; and wherein the light detection means is operative to generate the first and second signals corresponding to each laser beam reflection.

14. The laser-based apparatus of claim 13 including a means for generating a pulse signal representative of a start of each laser pulse period.

15. The apparatus of claim 12 wherein the optical filter element is operative to transmit the first portion of the reflections of said third optical path therethrough and to reflect the second portion of the reflections of said third optical path to a fourth optical path, said transmission and reflection of the first and second portions by the optical filter element being dependent on the Doppler wavelength shift of said reflections.

16. The apparatus of claim 15 wherein the optical filter element has a sharp cut off transmission response with respect to wavelength such that a small Doppler shift in wavelength away from the laser emission wavelength will produce a detectable change in transmission characteristics of the optical filter element.

17. The apparatus of claim 16 wherein the optical filter element is tuned to receive the laser emission wavelength along a cut off edge of the transmission response.

18. A distributed laser-based system for use on-board an aircraft for determining both altitude and ground velocity of said aircraft, said system comprising:

at least three laser-based measurement apparatus for disposition at different locations on said aircraft, each said apparatus comprising:

a laser source for emitting pulsed laser beams substantially at a predetermined wavelength over a first optical path;

a plurality of first optical elements for directing said laser beams from said first optical path to a second optical path which exits said first optical elements;

a plurality of second optical elements configured to form a telescope with a predetermined field of view, said second optical path and telescope field of view being fixedly co-aligned;

said telescope for receiving Doppler wavelength shifted reflections of said pulsed laser beams within the field of view thereof and directing said received reflections substantially over a third optical path;

an optical filter element disposed in said third optical path for separating the reflections of said third optical path into first and second portions that are dependent on the Doppler wavelength shift of said reflections; and light detection means for receiving said first and second portions and generating first and second signals representative of said first and second portions, respectively;

each said laser-based apparatus configurable to direct its co-aligned second optical path and telescope field of view from said aircraft to a different ground position from the other laser-based apparatus; and a processing unit for receiving and processing said first and second signals from said at least three laser-based apparatus to determine both said altitude and ground velocity of said aircraft.

19. The system of claim 18 wherein the processing unit is operative to determine a ground speed of the aircraft for each laser-based apparatus based on a function of the corresponding first and second signals generated thereby.

20. The system of claim 19 wherein the processing unit is operative to associate the ground speed with the corresponding laser beam directional configuration of the at least three laser-based apparatus, and operative to determine ground velocity using the ground speeds and corresponding laser beam directions of the at least three laser-based apparatus.

21. The system of claim 20 wherein the processing unit is operative to determine ground velocity of the aircraft by a triangulation of the ground speeds and corresponding laser beam directions of the at least three laser-based apparatus.

22. The system of claim 18 wherein the processing unit is operative to determine a ground speed of the aircraft for each of the at least three laser-based apparatus based on a ratio of a difference over a sum of the first and second signals corresponding thereto.

23. The system of claim 18 wherein the laser source of each of the at least three laser-based apparatus is autonomously operative to periodically generate laser pulses; and wherein the light detection means of each of the at least three laser-based apparatus is operative to generate the first and second signals corresponding to each received laser beam reflection.

24. The system of claim 23 wherein each laser-based apparatus includes means for generating a pulse signal representative of a start of each laser pulse period thereof.

25. The system of claim 24 wherein the processing unit is operative to determine altitude of the aircraft based on the pulse signal and at least one of the first and second signals of at least one of the at least three laser-based apparatus.

* * * * *